US006991209B2

(12) United States Patent
Ball

(10) Patent No.: US 6,991,209 B2
(45) Date of Patent: Jan. 31, 2006

(54) FLOW-REGULATING DEVICE

(76) Inventor: Tom Ball, 25 Fisherman Drive, Unit #13, Brampton, Ontario (CA) L7A 1C9

( * ) Notice: Subject to any disclaimer, the term of this patent is extended or adjusted under 35 U.S.C. 154(b) by 82 days.

(21) Appl. No.: 10/725,390

(22) Filed: Dec. 3, 2003

(65) Prior Publication Data

US 2004/0144937 A1 Jul. 29, 2004

Related U.S. Application Data

(60) Provisional application No. 60/430,688, filed on Dec. 4, 2002.

(51) Int. Cl.
F16K 7/04 (2006.01)
(52) U.S. Cl. .......................................................... 251/8
(58) Field of Classification Search .................... 251/4, 251/7, 8
See application file for complete search history.

(56) References Cited

U.S. PATENT DOCUMENTS

| 3,285,563 | A | * | 11/1966 | Clarkson | 251/8 |
| 3,410,517 | A | * | 11/1968 | Wall | 251/6 |
| 3,675,656 | A | * | 7/1972 | Hakim | 606/158 |
| 3,826,461 | A | * | 7/1974 | Summerfield et al. | 251/7 |
| 4,230,151 | A | | 10/1980 | Jonsson | 137/595 |
| 4,442,954 | A | | 4/1984 | Bergandy | 222/55 |
| 5,024,029 | A | | 6/1991 | Abbott et al. | 51/438 |
| 5,098,060 | A | * | 3/1992 | Mogler et al. | 251/7 |
| 5,535,983 | A | | 7/1996 | Hohermuth | 251/5 |
| 5,592,974 | A | | 1/1997 | Grohs et al. | 138/44 |
| 5,901,745 | A | | 5/1999 | Buchtel | 137/595 |
| 6,129,702 | A | | 10/2000 | Woias et al. | 604/65 |
| 6,358,048 | B1 | | 3/2002 | Peralta | 433/28 |

FOREIGN PATENT DOCUMENTS

| EP | 0544708 | 10/1994 |
| EP | 0637707 | 10/1996 |
| EP | 0690254 | 11/1998 |
| WO | WO 98/05892 | 2/1998 |
| WO | WO 98/24496 | 6/1998 |

OTHER PUBLICATIONS

VWR Catalogue #21704-908, 2002.
VWR Catalogue #21716-110, 2002.

* cited by examiner

Primary Examiner—Edward K. Look
Assistant Examiner—John K. Fristoe, Jr.
(74) Attorney, Agent, or Firm—Kimberly A. McManus

(57) ABSTRACT

A flow-regulating device is provided for external placement along a garden hose to control the water flow therethrough. The flow-regulating device comprises an open-ended hollow housing for receiving the hose. A compression member for compressing the hose against the housing. An actuator mounted on the housing for moving the compression member toward and away from the hose thereby controlling the compression of the hose to vary the flow of fluid through the hose. The hollow housing may also have a longitudinal slot therein for inserting the hose.

38 Claims, 10 Drawing Sheets

FLOW-REGULATING DEVICE

CROSS REFERENCE TO RELATED APPLICATION

This application claims the benefit of U.S. provisional application Ser. No. 60/430,688, filed Dec. 4, 2002, entitled "A FLOW-REGULATING DEVICE".

FIELD OF THE INVENTION

The present invention relates to a flow-regulating device. In particular, the present invention relates to a flow-regulating device for external placement anywhere along the length of a garden hose to control the water flow therethrough.

BACKGROUND OF THE INVENTION

A common method for watering an area, such as a lawn, involves the use of a garden hose with a sprinkler. The sprinkler is used to distribute a uniform pattern of water to a certain area of the lawn. Examples of different types of sprinklers include an oscillating fan sprinkler, the spiraling fountain sprinkler and the turning-pulsating sprinkler. Typically, one end of the hose is attached to a water spigot and the other end of the hose is attached to the sprinkler. The sprinkler is then placed in a desired area to be watered. A user then turns on the water flow from the spigot by turning the knob. The water is forced through the hose and distributed by the sprinkler to the desired area such that areas that are distant from the water spigot may be watered. By regulating the flow rate from the spigot, the user may also alter the speed of the sprinkler and the pattern it follows in watering the area. After the sprinkler is set up in the desired location, the user is free to attend to other tasks while the area is watered.

When full water pressure is available to the sprinkler, the sprinkler provides the maximum area of coverage based on its' design. If the user wishes to adjust the water pressure to change the area of coverage of the sprinkler, the user may spend a great amount of time adjusting the sprinkler for a desired smaller area. This adjustment requires walking to the water spigot, making a flow rate adjustment and walking back to the sprinkler to observe the new water coverage area. This is especially inconvenient when the sprinkler is out of eyesight from the water spigot.

It is apparent therefore that there is a need for a flow-regulating device which allows flow rate adjustment without the inconvenience of walking back and forth to the water spigot.

SUMMARY OF THE INVENTION

In one aspect of the present invention, there is provided a flow-regulating device which allows flow rate adjustment without the inconvenience of walking back and forth to the water spigot.

It is another aspect of the present invention to provide a flow-regulating device that is easily mounted at a position along the length of the hose without having to disconnect the hose from the water spigot or sprinkler in order to mount the flow-regulating device.

It is another aspect of the invention, to provide a flow-regulating device that is slideable along the entire length of the hose for the most advantageous view of the sprinkler.

It is yet another aspect of the invention, to provide an open-ended hollow housing that has a length that inhibits angling of the hose with respect to the compression member if the hose is moved. Thus, if the flow rate is set and the hose is later moved, the flow rate does not substantially change.

In accordance with one aspect of the present invention, there is provided a flow-regulating device for a hose to control a flow of fluid therethrough, the hose having a cross-section, the flow-regulating device comprising:
 an open-ended hollow housing having a longitudinal slot for inserting the hose;
 a compression member operable to compress the hose against the housing; and
 an actuator mounted on the housing for moving the compression member toward and away from the hose thereby controlling the compression of the hose to vary the flow of fluid through the hose.

In accordance with another aspect of the present invention, there is provided a flow-regulating device for a hose to control a flow of fluid therethrough, the hose having a cross-section, the flow-regulating device comprising:
 a hollow housing having a first open end and a second open end for inserting the hose therethough, the hollow housing being slideable along the hose;
 a compression member operable to compress the hose against the housing; and
 an actuator mounted on the housing for moving the compression member toward and away from the hose thereby controlling the compression of the hose to vary the flow of fluid through the hose.

In accordance with yet another aspect of the present invention, there is provided a flow-regulating device for a hose to control a flow of fluid therethrough, the hose having a cross-section, the flow-regulating device comprising:
 an open-ended hollow housing for receiving the hose,
 a compression member for compressing the hose against the housing; and
 an actuator mounted on the housing for moving the compression member toward and away from the hose thereby controlling the compression of the hose to vary the flow of fluid through the hose.

In accordance with another aspect of the present invention, there is provided a flow-regulating device for a hose to control a flow of fluid therethrough, the hose having a cross-section, the flow-regulating device comprising:
 an open-ended hollow housing having a longitudinal slot for inserting the hose;
 a compression member for compressing the hose against the housing; and
 an actuator mounted on the housing for moving the compression member toward and away from the hose thereby controlling the compression of the hose to vary the flow of fluid through the hose.

BRIEF DESCRIPTION OF THE DRAWINGS

The present invention will become more fully understood from the detailed description given herein and from the accompanying drawings, wherein like numerals denote like parts. The accompanying drawings are given by way of illustration only and do not limit the intended scope of the invention.

DETAILED DESCRIPTION OF THE EMBODIMENTS

Figure 1:
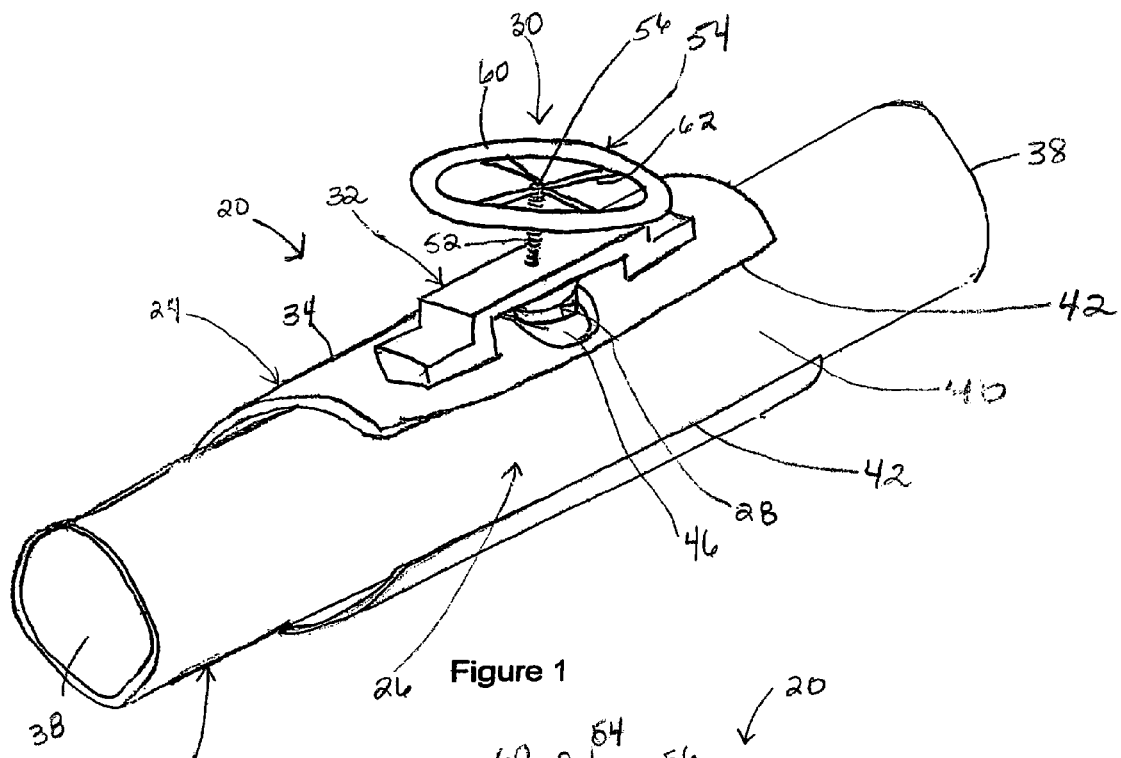
FIG. 1 shows a perspective view of a flow-regulating device and a hose-inserted therein in accordance with a first embodiment of the present invention.
Figure 2:
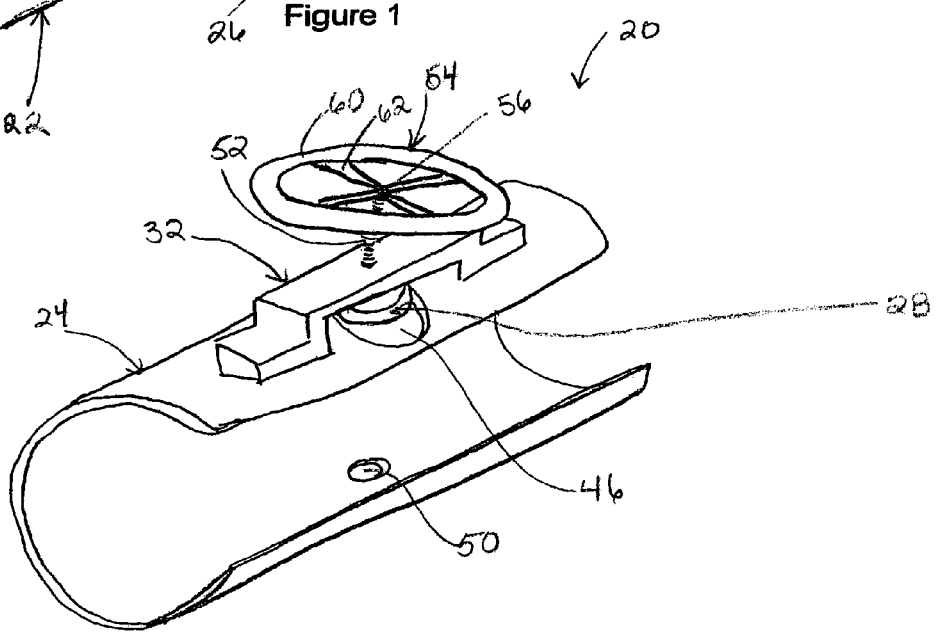
FIG. 2 shows a perspective view of the flow-regulating device of FIG. 1 without the hose.
Figure 3:
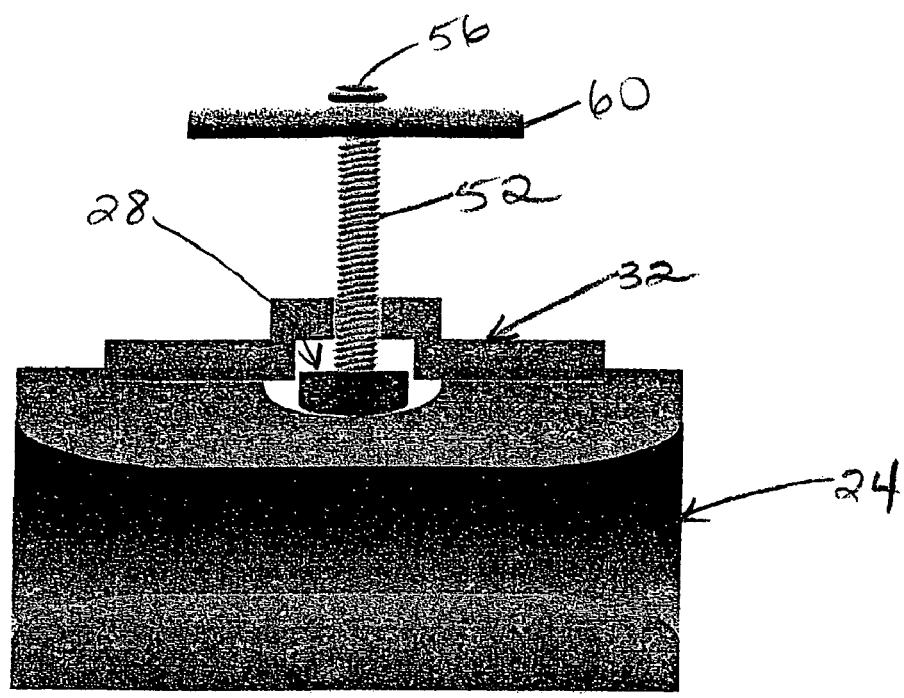
FIG. 3 shows a front view of the flow-regulating device of FIG. 1.

A first embodiment of the flow-regulating device is shown in FIGS. 1, 2 and 3 and indicated generally by the numeral 20. The flow-regulating device 20 is operable to partially encompass the exterior of a typical garden hose 22 (diameter of about 3.0 cm) to regulate the flow of fluid therethrough. The flow-regulating device 20 has an open-ended hollow housing 24 having a longitudinal slot 26 for inserting the hose 22. A compression member 28 is operable to compress the hose 22 against the housing 24. An actuator 30 is mounted on the housing 24 for moving the compression member 28 toward and away from the hose thereby controlling the compression of the hose 22 to vary the flow of fluid through the hose 22.

Figure 4:
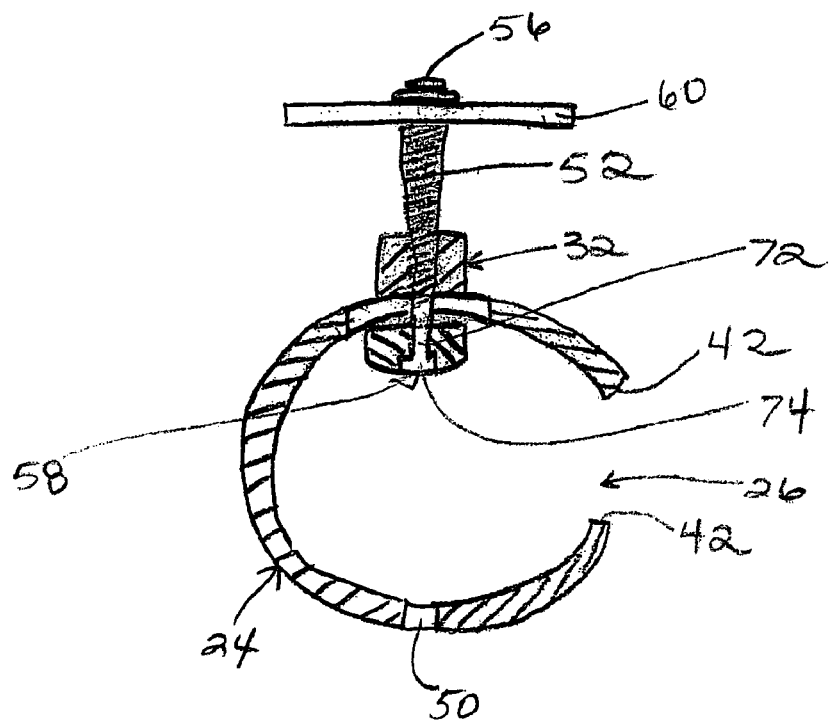
FIG. 4 shows an end view of the flow-regulating device of FIG. 1 with a open-ended hollow housing, a compression member and a guide bracket in section.
Figure 5:
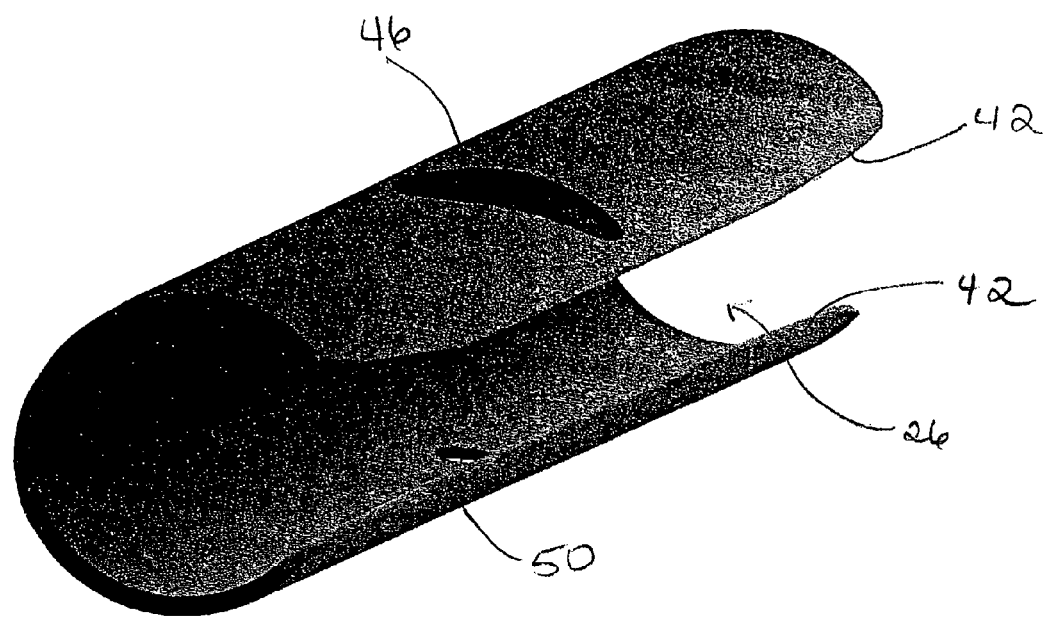
FIG. 5 shows a perspective view of the open-ended hollow housing of FIG. 1.
Figure 6:
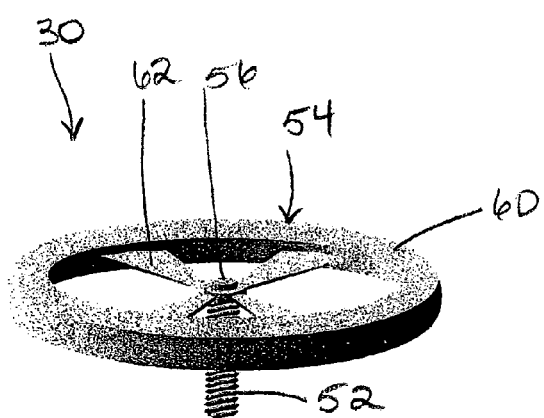
FIG. 6 shows a perspective view of an actuator of FIG. 1.
Figure 7:
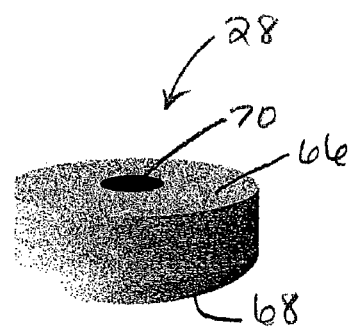
FIG. 7 shows a perspective view of the compression member of FIG. 1.

The actuator 30 is mounted on the housing 24 using a guide bracket 32. FIG. 4 shows a cross-sectional view of the flow-regulating device of FIGS. 2 and 3.

Reference is now made to FIGS. 1 to 5 to describe the open-ended hollow housing 24 in more detail. The open-ended hollow housing 24 is a sleeve 34 with a channel therethrough for receiving the hose 22; the hose 22 has two ends 38 and a body 40. The length and diameter of the open-ended hollow housing 24 is about 10.2 cm and about 3.2 cm, respectively. The sleeve 34 has a slot 26 defined between two longitudinal edges 42, which results in a C-shaped cross-section of the sleeve 34. The slot 26 is large enough for the body 40 of the hose 22 to pass therethrough but small enough to permit the hose 22 to be retained within the channel during use. The slot 26 is about 1.9 cm wide and about 10.2 cm long. To remove the hose 22 from the open-ended hollow housing 24, the user applies some force to pull the body 40 of the hose 22 back through the slot 26.

The sleeve 34 has an aperture 46 for permitting the compression member 28 to pass therethrough and another aperture 50 opposite the aperture 46. The aperture 50 is used for manufacturing purposes to more easily assemble the compression member 28 and the actuator 30.

The actuator 30 and compression member 28 will now be described in more detail with reference to FIGS. 1, 2, 3, 4, 6 and 7. The actuator 30 has an externally threaded shaft 52. One end of the shaft 52 is coupled to an adjuster knob 54 by a fastener 56, for example a standard knob screw, and the other end of the shaft 52 is coupled to the compression member 28 by a fastener 58. The adjuster knob 54 is a wheel 60 with spokes 62. The spokes 62 permit the wheel 60 to be fastened to one end of the shaft 52.

The compression member 28 is cylindrical with a flat end 66 and a curved end 68. When the actuator 30 is activated to move the compression member 28 towards the hose 22, the curved end 68 compresses the hose 22. The compression member 28 has a central aperture 70 that is shaped for receiving the fastener 58. The fastener 58 has a threaded rod 72 with a head 74 at an end thereof. The other end of the threaded rod 72 is threadingly engaged with the externally threaded shaft 52 so that the compression member 28 is coupled to the actuator 30. The compression member 28 freely rotates about the threaded rod 72 and the head 74. The head 74 of fastener 58 is not flush with the curved end 68 of the compression member 28 but slightly recessed, as shown in FIG. 3, to inhibit erosion of the hose 22 by the head 74 of the fastener 58.

Figure 8:
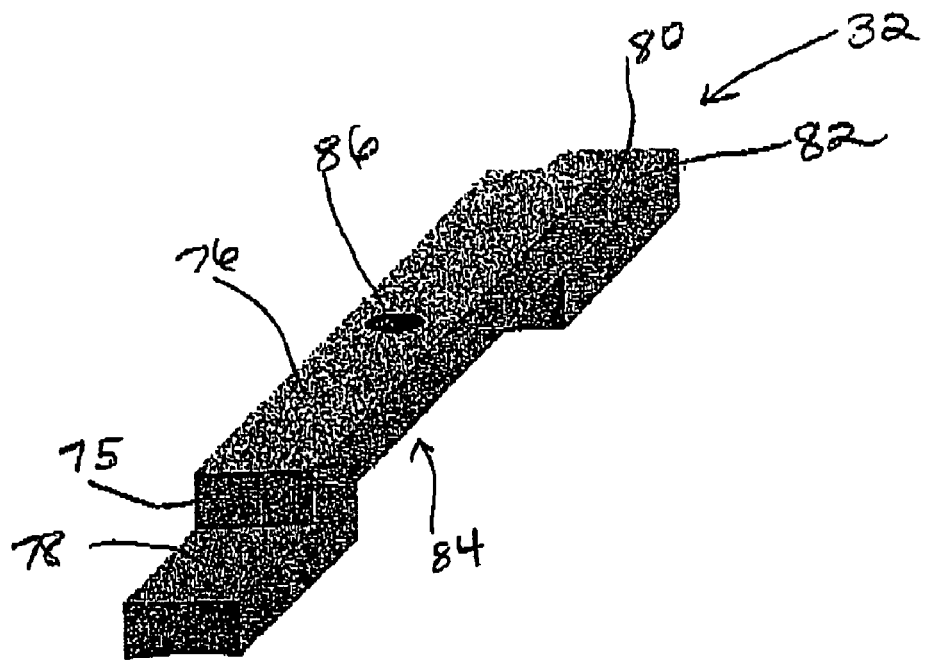
FIG. 8 shows a perspective view of the guide bracket of FIG. 1.
Figure 9:
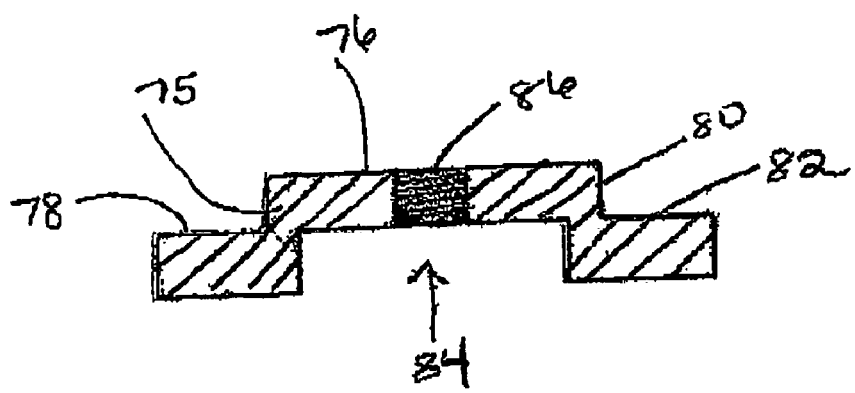
FIG. 9 shows a cross-sectional view of the guide bracket of FIG. 8.

The guide bracket 32 is now described in more detail with reference to FIGS. 8 and 9. The guide bracket 32 is a stepped bracket. One end 75 of a generally rectangular section 76 extends downwardly to a first shoulder 78 and the other end 80 of the rectangular section 76 extends downwardly to a second shoulder 82. A space 84 is defined between the underside of the rectangular section 78, and the first and second shoulders 78 and 82, respectively, for housing the compression member 28, when the compression member 28 is not compressing the body 40 of the hose 22. The first and second shoulders 78 and 82, respectively, are each welded or bonded by an adhesive to the surface of the sleeve 34. The rectangular section 76 has a centrally located internally threaded aperture 86 that is aligned with the space 84 and the aperture 46 of the sleeve 34. The internally threaded aperture 86 threadingly engages the externally threaded shaft 52 of the actuator 30 for controlled radial movement of the compression member 28 with respect to the hose 22. The compression member 28 is moveable through the aperture 46 and into the space 84 when the compression member 28 is opened completely.

Figure 10:
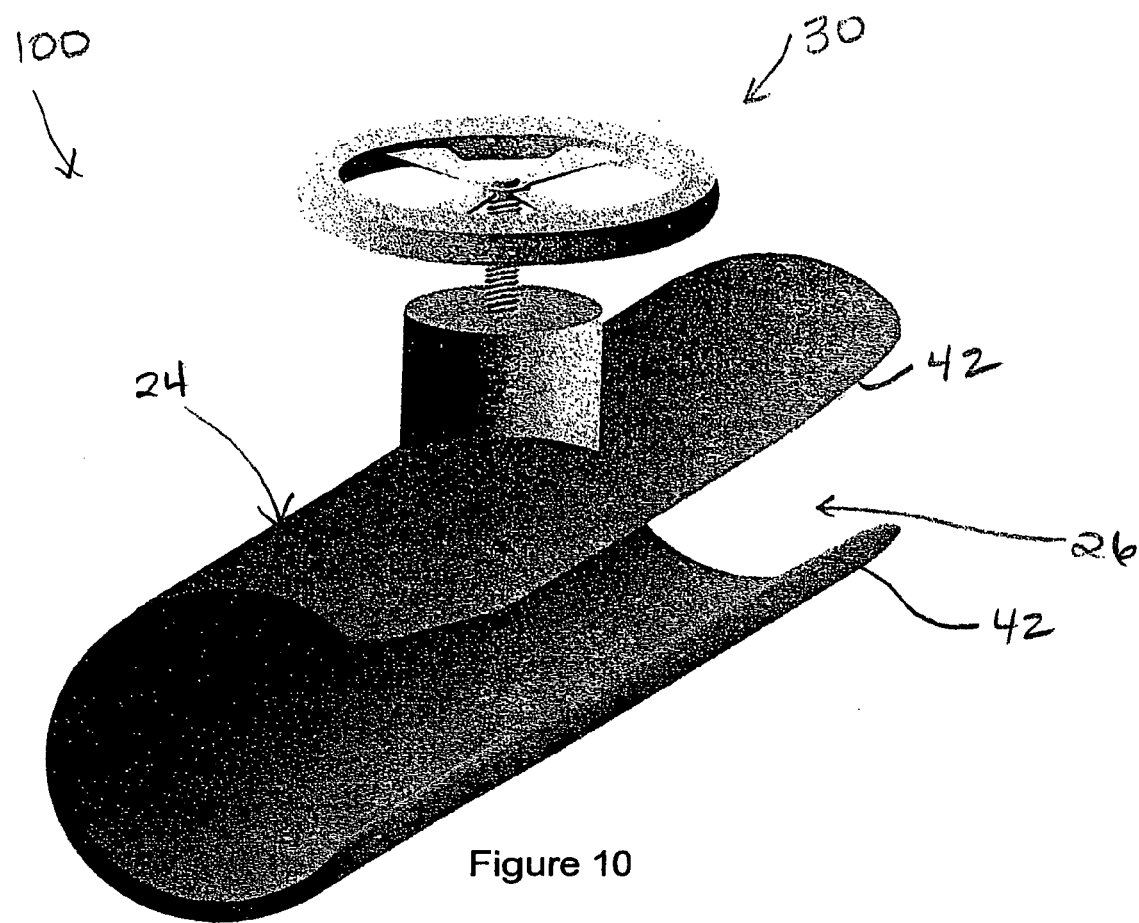
FIG. 10 shows a perspective view of a flow-regulating device in accordance with a second embodiment of the present invention.
Figure 11:
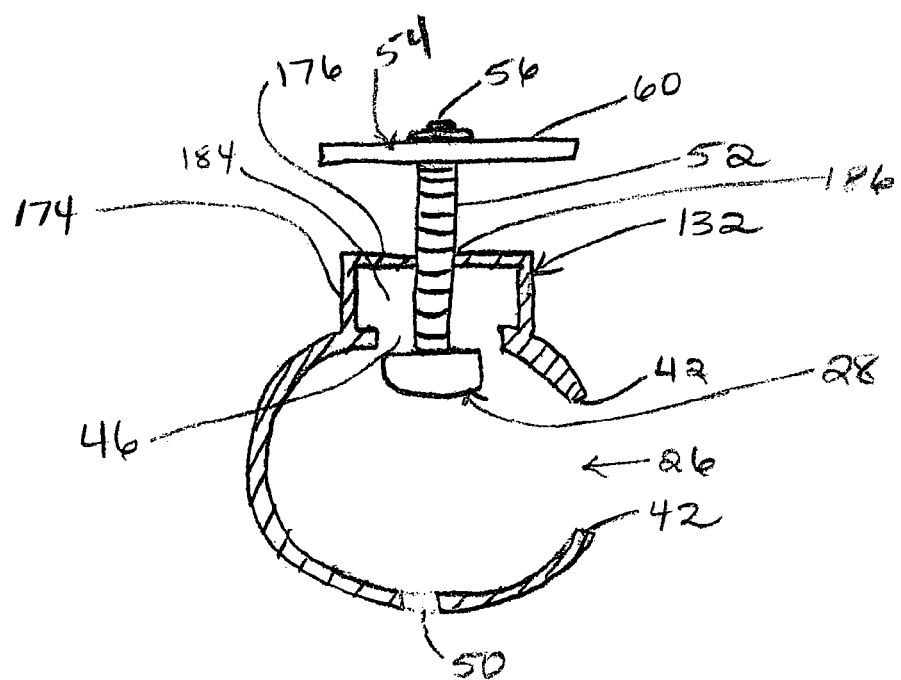
FIG. 11 shows an end view of the flow-regulating device of FIG. 10 with the open-ended hollow housing and an integral bracket in section.

A second embodiment of the flow-regulating device is shown in FIGS. 10 and 11 and indicated generally by the numeral 100. The flow-regulating device 100 has the open-ended hollow housing 24 with the longitudinal slot 26 for inserting the hose 22. The compression member 28 is operable to compress the hose 22 against the housing 24. The actuator 30 is mounted on the housing 24 for moving the compression member 28 toward and away from the hose thereby controlling the compression of the hose 22 to vary the flow of fluid through the hose 22. The actuator 30 is mounted on the housing 24 using an integral guide bracket 132.

The flow-regulating device 100 is similar to the flow-regulating device 20, in that it has the open-ended hollow housing 24 for receiving the hose 22, the actuator 30 and the compression member 28. The difference lies in that the actuator 30 and compression member 28 are mounted on the housing 24 using an integral guide bracket 132 rather than the guide bracket 32 of the device 20. The parts, other than the integral guide bracket 132 of this embodiment, are understood to be the same as those described in the previous embodiment.

The guide bracket 132 is integral with the housing 24. A wall 174 extends downwardly to the surface of the sleeve 34 from a generally circular section 176. A space 184 is defined between the underside of the circular section 176 and the wall 174, for housing the compression member 28, when the compression member 28 is not compressing the body 40 of the hose 22. The circular section 176 has a centrally located internally threaded aperture 186 that is aligned with the space 184 and the aperture 46 of the sleeve 34. The internally threaded aperture 186 threadingly engages the externally threaded shaft 52 of the actuator 30 for controlled radial movement of the compression member 28 with respect to the hose 22. The compression member 28 is moveable through the aperture 46 and into the space 184 when the compression member 28 is opened completely.

Figure 12:
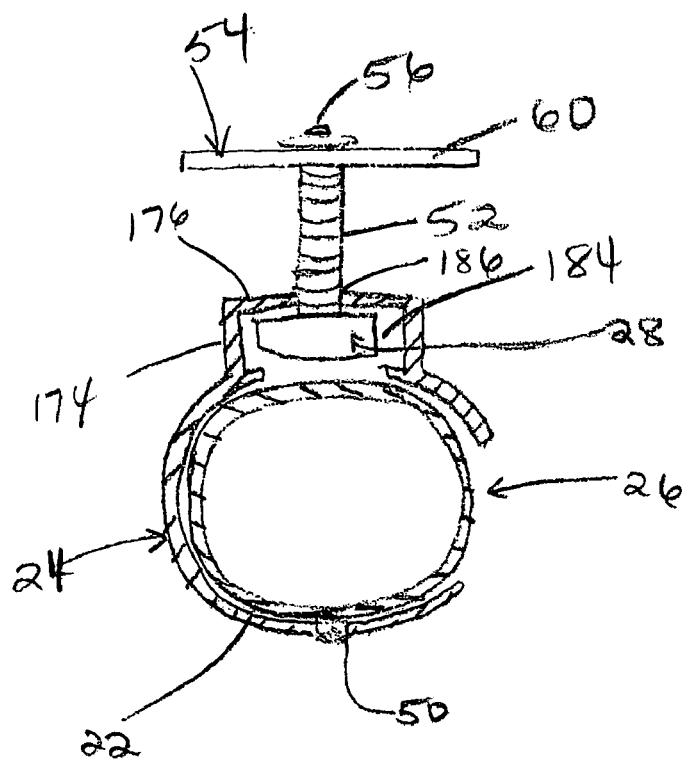
FIG. 12 shows an end view of the flow-regulating device of FIG. 10 with the hose, the open-ended hollow housing and the integral bracket in section, and the compression member in the open position.
Figure 13:
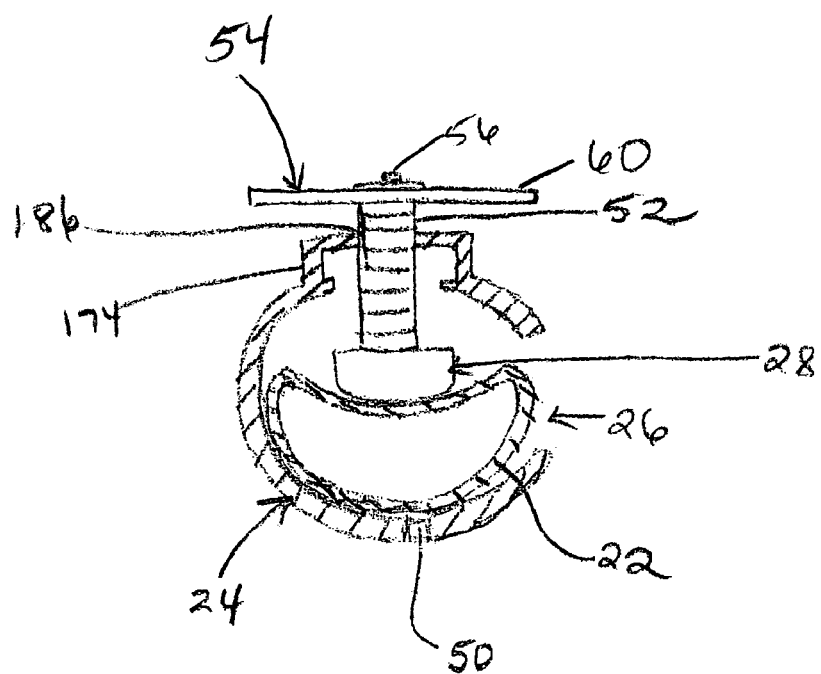
FIG. 13 shows an end view of the flow-regulating device of FIG. 10 with the hose, the open-ended hollow housing and the integral bracket in section, and the compression member in the partially closed position.

Operation of the flow-regulating devices 20 and 100 will now be described with reference to the figures and to the preceding description. In an opened position, as shown in FIGS. 1 and 12, the compression member 28 is housed in the space 84, 184. The body 40 of the hose 22 is inserted through the slot 26 to be retained within the channel. The adjuster knob 54 is rotated by the user, causing the externally threaded shaft 52 to rotate towards the hose 22. As a result, the compression member 28 coupled to the end of the shaft 52 compresses the hose 22 against the inside surface of the sleeve 34 causing the walls of the hose 22 to collapse together and restrict flow of fluid, as shown in FIG. 13. It will be understood that the flow of fluid through the hose 22 will vary depending on how much the adjuster knob 54 is rotated in relation to the compression member 28 against the hose 22.

It will also be understood that embodiments of flow-regulating devices 200, 300 and 400 described below, operate in a similar manner as that previously described for the flow-regulating devices 20 and 100.

Figure 14:
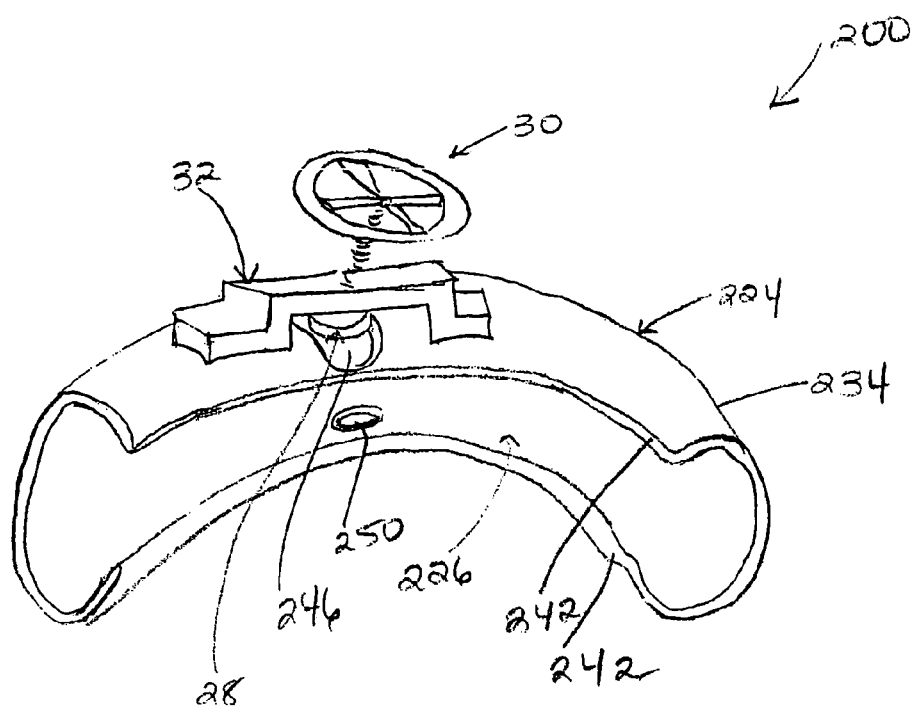
FIG. 14 shows a perspective view of a flow-regulating device with an open-ended curved hollow housing in accordance with a third embodiment of the present invention.

A third embodiment of the flow-regulating device is shown in FIG. 14 and indicated generally by the numeral 200. The flow-regulating device 200 has an open-ended curved hollow housing 224 with a longitudinal slot 226 for inserting the hose 22. The compression member 28 is operable to compress the hose 22 against the housing 224. The actuator 30 is mounted on the housing 224 for moving the compression member 28 toward and away from the hose thereby controlling the compression of the hose 22 to vary the flow of fluid through the hose 22. The actuator 30 is mounted on the curved housing 224 using the guide bracket 32. The parts, other than the curved housing 224 of this embodiment, are understood to be the same as those described in the previous embodiments.

Figure 14A:
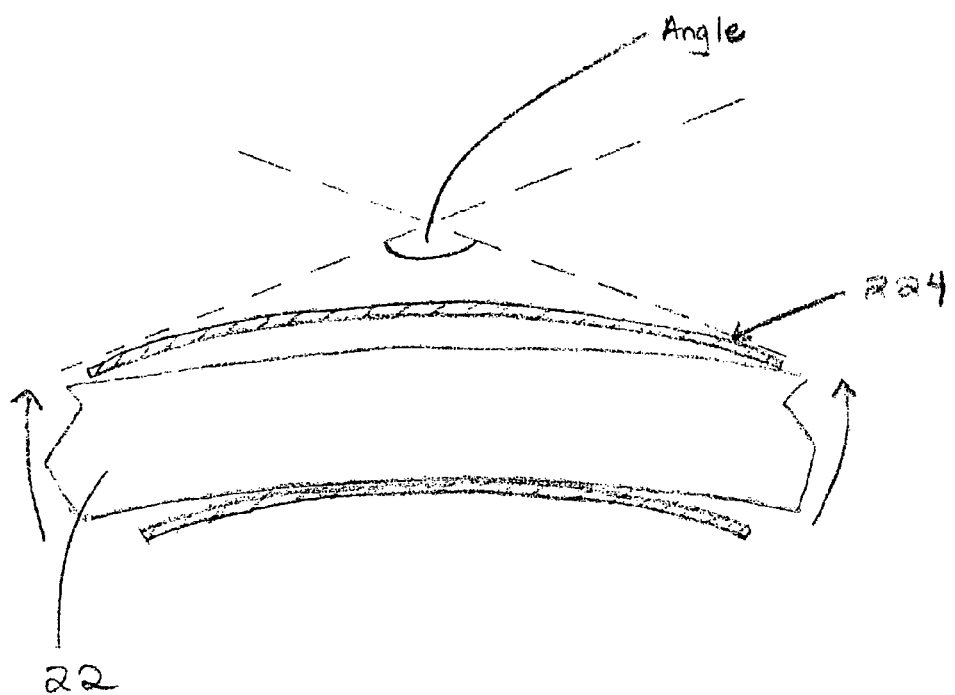
FIG. 14a shows a cross-sectional view of the open-ended curved hollow housing of FIG. 14 with the hose positioned therein.

The open-ended curved hollow housing 224 is a curved sleeve 234 with a channel therethrough for receiving the hose 22. The sleeve 234 is curved at an angle of about 135° to about 150°. The angle is depicted in FIG. 14a. The length and diameter of the open-ended curved hollow housing 24 is about 7 cm and about 3.2 cm, respectively. Compared to the embodiments previously described, the open-ended curved hollow housing 24 is shorter. The shorter length is possible due to the curvature of the housing 24. As shown in FIG. 14a, the hose 22 will be forced upwards, as indicated by the arrows, due to the hose 22 wanting to maintain its natural resting position. This permits the proper position of the hose 22 relative to the compression member 28. The sleeve 234 has a slot 226 defined between two longitudinally curved edges 242, which results in a C-shaped cross-section of the sleeve 234. The slot 226 is large enough for the body 40 of the hose 22 to pass therethrough but small enough to permit the hose 22 to be retained within the channel during use. The slot 226 is about 1.9 cm wide and about 7 cm long. To remove the hose 22 from the open-ended curved hollow housing 224, the user applies some force to pull the body 40 of the hose 22 back through the slot 226.

The curved sleeve 234 has an aperture 246 for permitting the compression member 28 to pass therethrough and another aperture 250 opposite the aperture 246. The aperture 250 is used for manufacturing purposes to more easily assemble the compression member 28 and the actuator 30.

Figure 15:
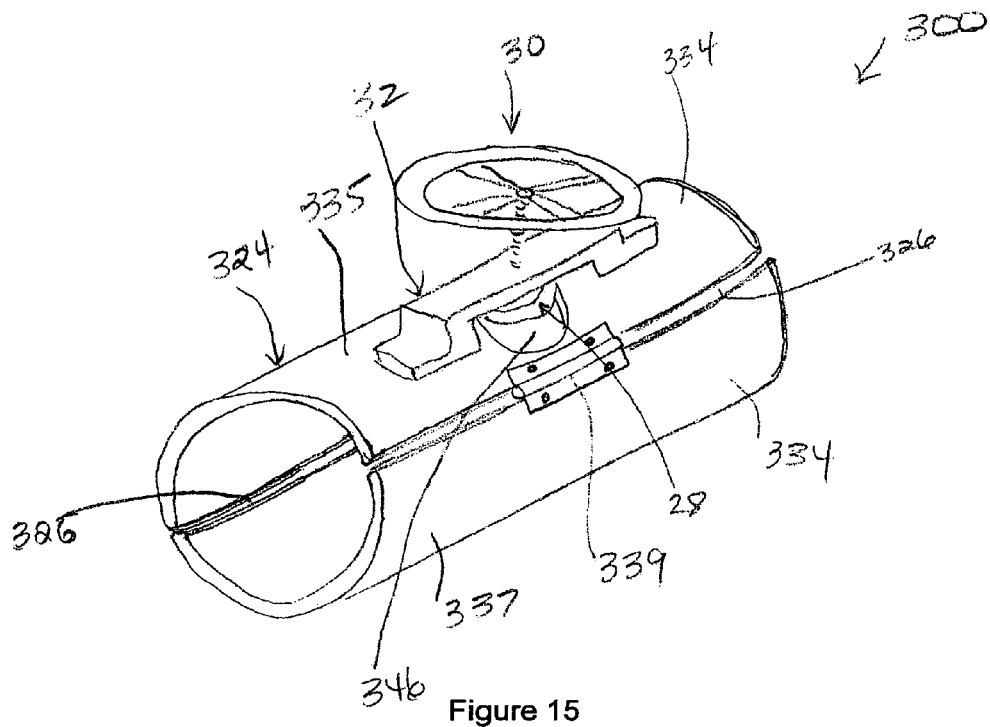
FIG. 15 shows a back perspective view of a flow-regulating device in accordance with a fourth embodiment of the present invention.
Figure 16:
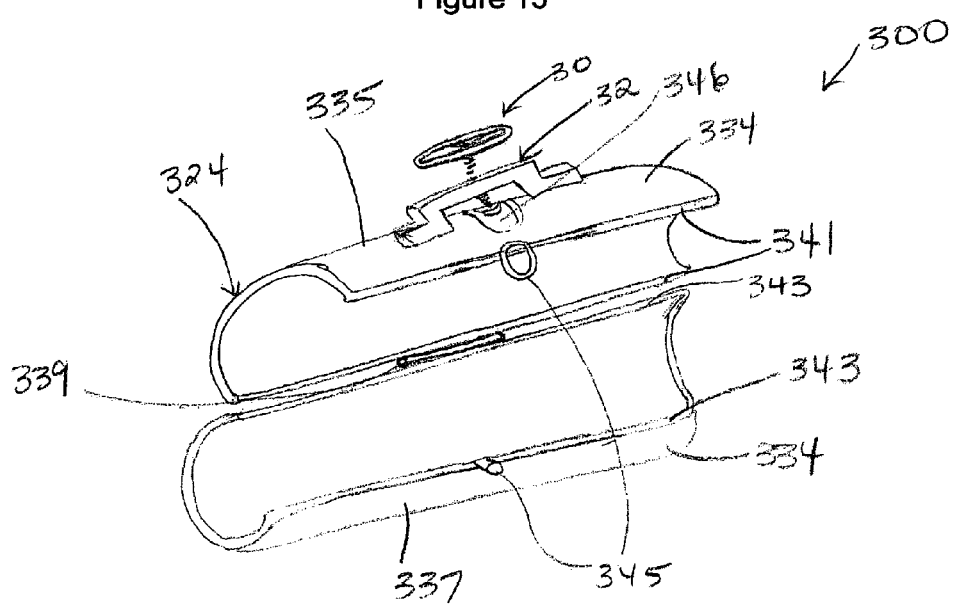
FIG. 16 shows a front perspective view of the flow-regulating device of FIG. 15 in an opened position for receiving the hose.

A fourth embodiment of the flow-regulating device is shown in FIGS. 15 and 16 and indicated generally by the numeral 300. The flow-regulating device 300 has an open-ended hollow housing 324, which is a sleeve 334 with a channel therethrough for receiving the hose 22. The sleeve 334 has an upper portion 335 and a lower portion 337. A hinge 339 joins the upper portion 335 and the lower portion 337. The upper portion 335 has a longitudinal edge 341 and the lower portion has a longitudinal edge 343. Slots 326 are defined between the two longitudinal edges 341 and 343. The hinge 339 and slots 326 allows the user to open the upper or lower portion to receive a hose 22, as shown in FIG. 16, and close to substantially surround the hose 22. The length and diameter of the open-ended hollow housing 324 is about 10.2 cm and about 3.2 cm, respectively. A releasable lock 345, opposite the hinge 339, is attached to the upper and lower portions 335 and 337, respectively, to maintain the housing 324 in a closed position when in use. The upper portion 335 of the sleeve 334 has an aperture 346 for permitting the compression member 28 to pass therethrough. The parts, other than the housing 324 of this embodiment, are understood to be the same as those described in the previous embodiments.

Figure 17:
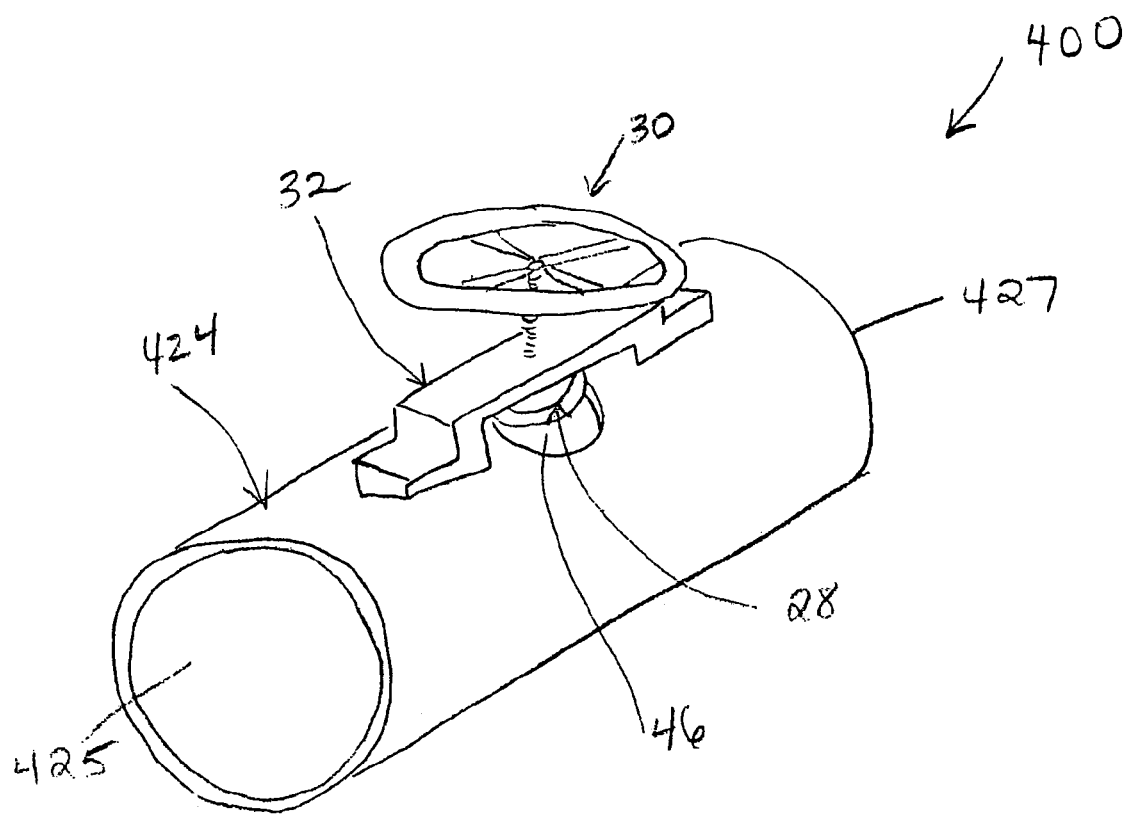
FIG. 17 shows a perspective view of a flow-regulating device in accordance with a fifth embodiment of the present invention.

A fifth embodiment of the flow-regulating device is shown in FIG. 17 and indicated generally by the numeral 400. The flow-regulating device 400 differs from the previous embodiments, in that an open-ended hollow housing 424 does not have a slot 26 through which the body 40 of the hose 22 is insertable. The open-ended hollow housing 424 is a sleeve 434 with a channel therethrough for receiving the hose 22. The hose 22 is fed through a first open-end 425 of the sleeve, into the channel and out a second open-end 427 of the sleeve. The diameter of the housing 424 is such that it permits any fittings that may be attached to the end of the hose (ie. adapters for attachment of the hose to sprinklers and water spigots) to fit therethrough. The length and diameter of the open-ended hollow housing 424 is about 13 cm and about 4.5 cm, respectively. The parts, other than the housing 424 of this embodiment, are understood to be the same as those described in the previous embodiments.

Figure 18:
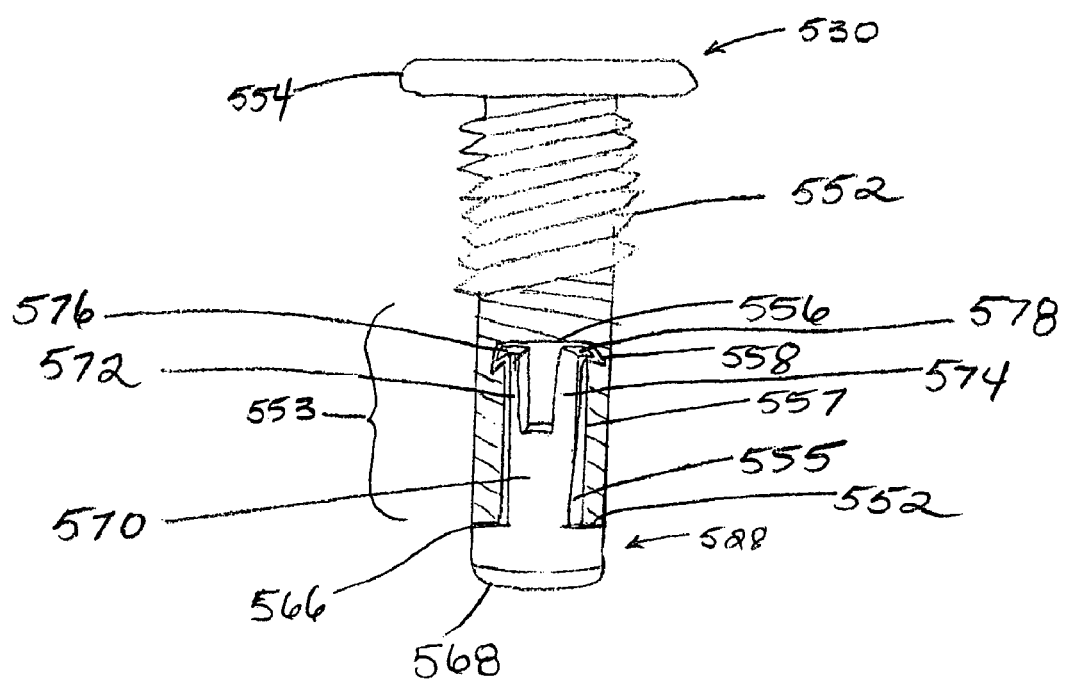
FIG. 18 shows a side view of a further actuator and compression member in accordance with a further embodiment of an actuator and compression member of the flow-regulating device of the present invention, the actuator is shown in partial section.

A further embodiment of an actuator and compression member that may be used in the flow-regulating device of the present invention is shown in FIG. 18. The actuator 530 has an externally threaded shaft 552. One end of the shaft 552 is integral with an adjuster knob 554. An opposite end portion 553 of the shaft 552 has a bore 555 extending partially therein and terminating at a wall 556. A circumferential wall 557 defines the bore 555. The circumferential wall 557 proximate the wall 556 extends radially outwardly to define a circumferential notch 558.

The compression member 528 is cylindrical with a curved end 568 and a flat end 566 and has a diameter that is approximately the same diameter of the shaft 552. The flat end 566 has a cylindrical projection 570 that extends from the center of the compression member 528 and has a diameter that is approximately half the diameter of the compression member 528. Two spaced arcuate extensions 572 and 574 protrude outwardly from the cylindrical projection 570. At the end of each extension 572 and 574 are flanges 576 and 578. To couple the compression member 528 to the end of the shaft 552, the cylindrical projection 570 with the extensions 572 and 574 is slid into the bore 555 of the shaft 552 of the actuator 530. The extensions 572 and 574 are bendable towards one another as the extensions 572 and 574 are slid along the bore 555 of the shaft 552 of the actuator 530. Once the flanges 576 and 578 meet the circumferential notch 558, the extensions 572 and 574 bias outwardly to allow the flanges 576 and 578 to engage the notch 558 to permit the compression member 528 to rotate relative to the actuator 530 while allowing the compression member 528 to remain attached to the actuator 530.

Alternative embodiments and variations to the above-described embodiments are possible. For example, the open-ended hollow housings may be any suitable sizes and shapes. The components of the flow-regulating devices may be made from any suitable material such as metal, metal alloy and/or plastic. The open-ended hollow housings may have various diameters (ie. channel widths) to accommodate different hose diameters, including the typical garden hose which has a diameter of about 3.0 to about 3.3 cm. In embodiments, the length and the diameter of the open-ended hollow housing is chosen to inhibit angling of the hose with respect to the compression member to inhibit changes in flow if the hose is moved. In one embodiment, the length of the open-ended hollow housing is at least about 10 cm for a hose diameter of at least about 2.5 cm.

The open-ended curved hollow housing of the flow-regulating devices of the present invention may be curved at an angle of greater than about 135° and less than about 180°.

Any type of actuator may be used to actuate the compression member of the above-described embodiments. In some embodiments, the adjuster knob may be any type of gripping means. The externally threaded shaft may be any type of threaded shaft. The compression member may be any compression member that permits flow of fluids at various rates through the hose. In other embodiments, the compression member and actuator may rotate together as opposed to rotating relative to one another, as described in the above-described embodiments. The latter, however, tends to minimize erosion of the hose over a number of uses.

Other embodiments of the flow-regulating devices do not have to include the guide bracket. For instance, the actuator itself may be directly coupled to the open-ended curved hollow housing (e.g. through a threaded aperture in the wall of the housing).

The flow-regulating devices of the present invention may be manufactured already mounted to the hose and slideable along the hose. In particular, a flow regulating device similar to that of the fifth embodiment may be mounted to the hose. The diameter of such a device may be narrower than the diameter of the device of the fifth embodiment since it does not have to accommodate the hose fittings.

With respect to the open-ended hollow housings with slots, the slot of the housing may be such that the slot is large enough for the body of the hose to pass therethrough but small enough to permit the hose to be retained within the channel during use. The slot of the fourth embodiment of the device is adjustable to permit the insertion of the hose. Therefore, the slot can be very narrow.

The housing of the fourth embodiment may be made of a resilient material, such as plastic, for example, that would permit the slot to be pried open to insert the body 40 of the hose 22. Therefore, eliminating the need for a hinge 339. If the resilient material is strong enough to remain biased in a closed position when the actuator and compression member are in use, there will also be no need for the releasable lock 345.

In addition, the hinge 339, may also be replaced with a biasing member such as a spring, which may also eliminate the need for the releasable lock 345.

The hinge may also be integral with the upper and lower portions of the sleeve and may extend the length of the sleeve.

Although certain embodiments of the invention have been described herein in detail, it will be understood by those skilled in the art that variations may be made thereto without departing from the spirit of the invention.

What is claimed is:

1. A flow-regulating device for a hose to control a flow of fluid therethrough, the hose having a cross-section, the flow-regulating device comprising:
   an open-ended hollow housing comprising a sleeve having a channel therethrough for receiving the hose and a longitudinal slot for inserting the hose therethrough, the longitudinal slot being large enough for the hose to pass therethrough but small enough for the hose to be retained within the channel during use;
   a compression member for compressing the hose against the housing; and
   an actuator mounted on the housing for moving the compression member toward and away from the hose thereby controlling the compression of the hose to vary the flow of fluid through the hose.

2. A flow-regulating device according to claim 1, wherein the flow regulating device is capable of being mounted along a length of the hose without having to disconnect the hose from a water spigot or sprinkler.

3. A flow-regulating device according to claim 1, wherein the flow regulating device is slideable along the length of the hose.

4. A flow-regulating device according to claim 1, wherein the open-ended hollow housing has a length that inhibits angling of the hose with respect to the compression member after a flow rate is set.

5. A flow-regulating device according to claim 1, wherein the open-ended hollow housing has a diameter that permits the hose to be inserted therethrough.

6. A flow-regulating device according to claim 1, wherein the sleeve has a C-shaped cross-section.

7. A flow-regulating device according to claim 1, wherein the sleeve has two longitudinal edges with the longitudinal slot defined therebetween.

8. A flow-regulating device according to claim 1, wherein the open-ended hollow housing has a length of at least about 10.2 cm and a diameter of at least about 2.5 cm.

9. A flow-regulating device according to claim 8, wherein the open-ended hollow housing has a length of about 13 cm and a diameter of about 4.5 cm.

10. A flow-regulating device according to claim 8, wherein the open-ended hollow housing has a length of about 10.2 cm and a diameter of about 3.2 cm.

11. A flow-regulating device according to claim 1, wherein the longitudinal slot has a width of about 1.9 cm and a length of about 10.2 cm.

12. A flow-regulating device according to claim 1, wherein the open-ended hollow housing is curved.

13. A flow-regulating device according to claim 12, wherein the open-ended hollow housing is curved at an angle of greater than about 135° and less than about 180°.

14. A flow-regulating device according to claim 12, wherein the open-ended hollow housing is curved at an angle of about 135° to about 150°.

15. A flow-regulating device according to claim 12, wherein the curved open-ended hollow housing has a length of about 7 cm and a diameter of about 3.2 cm.

16. A flow-regulating device according to claim 12, wherein the longitudinal slot has a width of about 1.9 cm and a length of about 7 cm.

17. A flow-regulating device according to claim 1, wherein the actuator comprises an adjuster knob coupled to a threaded shaft.

18. A flow-regulating device according to claim 17, wherein the adjuster knob is coupled to a first end of the threaded shaft and the compression member is coupled to a second end of the threaded shaft.

19. A flow-regulating device according to claim 18, wherein the device further comprises a guide bracket for mounting the actuator to the housing, the guide bracket comprising a threaded aperture for receiving the threaded shaft of the actuator for controlled radial movement of the compression member.

20. A flow-regulating device according to claim 19, wherein the sleeve has an aperture for permitting the compression member to pass therethrough into the channel.

21. A flow-regulating device according to claim 1, wherein an actuator comprises an adjuster knob integrally coupled to a threaded shaft.

22. A flow-regulating device according to claim 21, wherein the adjuster knob is integrally coupled to a first end of the threaded shaft and the compression member is coupled to a second end of the threaded shaft.

23. A flow-regulating device according to claim 1, wherein the compression member is cylindrical with a flat end and a curved end.

24. A flow-regulating device according to claim 23, wherein the curved end of the compression member is capable of contacting the hose.

25. A flow-regulating device according to claim 1, wherein the compression member rotates relative to the actuator.

26. A flow-regulating device according to claim 25, wherein the guide bracket is integral with the housing.

27. A flow-regulating device according to claim 26, wherein the open-ended hollow housing has a sleeve comprising a channel therethrough, the guide bracket being coupled or integrally coupled to the outside of the sleeve, external to the channel, the guide bracket housing the compression member when the actuator is in an opened position.

28. A flow-regulating device according to claim 1, wherein the device further comprises a guide bracket for mounting the actuator to the housing.

29. A flow-regulating device according to claim 1, wherein the device is made from at least one of metal, metal alloy, and plastic.

30. A flow-regulating device according to claim 1 mounted to the hose.

31. A flow-regulating device for a hose to control a flow of fluid therethrough, the hose having a cross-section, the flow-regulating device comprising:
an open-ended hollow housing comprising a longitudinal slot for inserting the hose therethrough, wherein the open-ended hollow housing comprises a resilient material that biases the housing to a closed position and is capable of moving from an opened position, wherein the hose is insertable through the longitudinal slot, to a closed position, wherein the hose is retainable therein;
a compression member for compressing the hose against the housing; and
an actuator mounted on the housing for moving the compression member toward and away from the hose thereby controlling the compression of the hose to vary the flow of fluid through the hose.

32. A flow-regulating device according to claim 31, wherein the open-ended hollow housing further comprises a releasable lock for releasably locking the upper portion and the lower portion of the open-ended hollow housing.

33. A flow-regulating device according to claim 31, wherein the actuator comprises an adjuster knob coupled to a threaded shaft.

34. A flow-regulating device according to claim 33, wherein the adjuster knob is coupled to a first end of the threaded shaft and the compression member is coupled to a second end of the threaded shaft.

35. A flow-regulating device according to claim 31, wherein an actuator comprises an adjuster knob integrally coupled to a threaded shaft.

36. A flow-regulating device according to claim 35, wherein the adjuster knob is integrally coupled to a first end of the threaded shaft and the compression member is coupled to a second end of the threaded shaft.

37. A flow-regulating device according to claim 31, wherein the compression member is cylindrical with a flat end and a curved end.

38. A flow-regulating device according to claim 31, wherein the open-ended hollow housing has a C-shaped cross-section and further comprises an upper portion and a lower portion, the upper portion having a longitudinal edge and the lower portion having a longitudinal edge, the longitudinal slot being defined between the longitudinal edge of the upper portion and the longitudinal edge of the lower portion.

* * * * *

UNITED STATES PATENT AND TRADEMARK OFFICE
CERTIFICATE OF CORRECTION

PATENT NO. : 6,991,209 B2 Page 1 of 1
APPLICATION NO. : 10/725390
DATED : January 31, 2006
INVENTOR(S) : Tom Ball It is certified that error appears in the above-identified patent and that said Letters Patent is hereby corrected as shown below:

Column 9, Claim 21, Line 49
 Please replace "an actuator" with --the actuator--

Column 10, Claim 27, Line 2
 Please replace "a sleeve" with --the sleeve--

Column 10, Claim 27, Line 3
 Please replace "a channel" with --the channel--

Column 10, Claim 31, Line 25
 Please replace " to a" with --to the--

Column 10, Claim 32, Line 36
 Please replace "the upper" with --an upper--

Column 10, Claim 32, Line 37
 Please replace "the lower" with --a lower--

Column 10, Claim 35, Line 46
 Please replace "an actuator" with --the actuator--

Signed and Sealed this

Nineteenth Day of December, 2006

JON W. DUDAS
*Director of the United States Patent and Trademark Office*